United States Patent [19]

Schreiter

[11] Patent Number: 4,591,245

[45] Date of Patent: May 27, 1986

[54] FOCUSING ARRANGEMENT FOR A REFLECTING TELESCOPE

[76] Inventor: Michael Schreiter, 20, Brucknerstr., 5300 Weimar, District of Erfurt, German Democratic Rep.

[21] Appl. No.: 511,066

[22] Filed: Jul. 5, 1983

[30] Foreign Application Priority Data

Jul. 27, 1982 [DD] German Democratic Rep. ... 241966

[51] Int. Cl.$^4$ ............................................ G02B 17/00
[52] U.S. Cl. .................................................... 350/504
[58] Field of Search ............... 350/503, 504, 505, 620, 350/623, 624, 626

[56] References Cited

U.S. PATENT DOCUMENTS 2,670,656  3/1954  Braymer ............................. 350/505
3,237,518  3/1966  Krajowsky et al. ................. 350/503

Primary Examiner—John K. Corbin
Assistant Examiner—Vincent J. Lemmo

[57] ABSTRACT

A focusing arrangement for focusing reflecting telescopes comprises a lever gear means operated by an adjustment screw, which is provided between the rear interior face of a telescope housing and a telescope mount for displacing the latter and the reflecting telescope as required. In diametral opposition to a connection point between the telescope mount and the gear means relative to an optical axis a resilient means is provided for acting on and counteracting the adjustment operation exerted by the screw and lever combination in the course of which the telescope and mount are displaced along a guide means symmetrically provided about said optical axis.

2 Claims, 2 Drawing Figures

FOCUSING ARRANGEMENT FOR A REFLECTING TELESCOPE

BACKGROUND OF THE INVENTION

The invention relates to an arrangement for focusing reflecting telescopes, in particular, the small type astronomic reflecting telescopes in which a primary reflector is displaced along the optical axis for adjustment of the entire arrangement.

The journal "Der Sternenbote", Wien, 25th volume, 1982, 2 in particular at pages 24 and 26, discloses a reflecting telescope comprising a spheric primary reflector, a secondary reflector and Schmidt plate, in which the principle or primary reflector is displaceably seated on a socket attached to the rear housing portion for displacements along the optical axis.

The focusing of the telescope is performed by means of an adjustment screw which via a lever means displaces the principal reflector along the socket.

The lever is rigidly secured to the reflector mount. This device is disadvantageous since the point of force of the adjustment screw actuated lever means acts considerably eccentrically relative to the optical axis, and, hence, to the center of the reflector so that undesired tiltings of the reflector occur when the latter has to be focussed. Furthermore, a reversal of the direction of rotation of the adjustment screw involves a dead travel due to the unavoidable backlash between the cooperating members so that an accurate focusing is rendered difficult.

BRIEF SUMMARY OF INVENTION

It is an object of the present invention to obviate the above disadvantages.

It is a further object of the invention to increase the utility value of a reflecting telescope.

These and other objects are realised in an arrangement for focusing reflecting telescopes which comprises a primary and a secondary reflector. The primary reflector which is secured to a central mount is displaceable along an optical axis on a guide means secured to the telescope housing.

According to the invention a lever gear means is provided between the mount of the primary reflector and the interior rear limiting face of the telescope housing. The lever gear means is adjustable by an adjustment screw.

At least one resilient member is provided at the mount to force the latter towards the interior rear limiting face, preferably in diametral opposition to the attachment point of the lever gear means.

Advantageously, the lever gear means is of the stationary cross loop gear type hinged via its one end portion to the telescope mount.

Its other end portion is provided with a roller which is operatively connected to the telescope housing. The adjustment screw is connected to the gear means via a connecting rod.

In a further embodiment the lever gear means is an elbow lever gear, the one arm of which is connected to the telescope housing and the other arm to the mount. The elbow joint is operatively connected to the adjustment screw by a connecting rod.

Advantageously, the resilient member is a spring which is secured via its respective end portions to the mount and to the telescope housing.

In order to focus a reflecting telescope according to the invention the primary reflector is displaced along the optical axis by action of the kinematic chain constituted of the adjustment screw, the lever means and the mount. By virtue of the arrangement according to the invention it is feasible to displace the primary reflector substantially without any backlash and tilt due to the arrangement of the pivotal points of the lever gear means and of the resilient membes at the mount, and due to the respective selection of the sliding materials and of the counter-pressure forces in the sliding bearings, and in the joints of the lever gear and in the roller.

A reversion dead period which reduces the adjustment precision does not occur.

BRIEF DESCRIPTION OF DRAWINGS

In order that the invention may be more readily understood reference is made to the accompanying drawings which illustrate diagrammatically and by way of example two embodiments thereof and where.

DETAILED DESCRIPTION OF INVENTION

Figure 1:
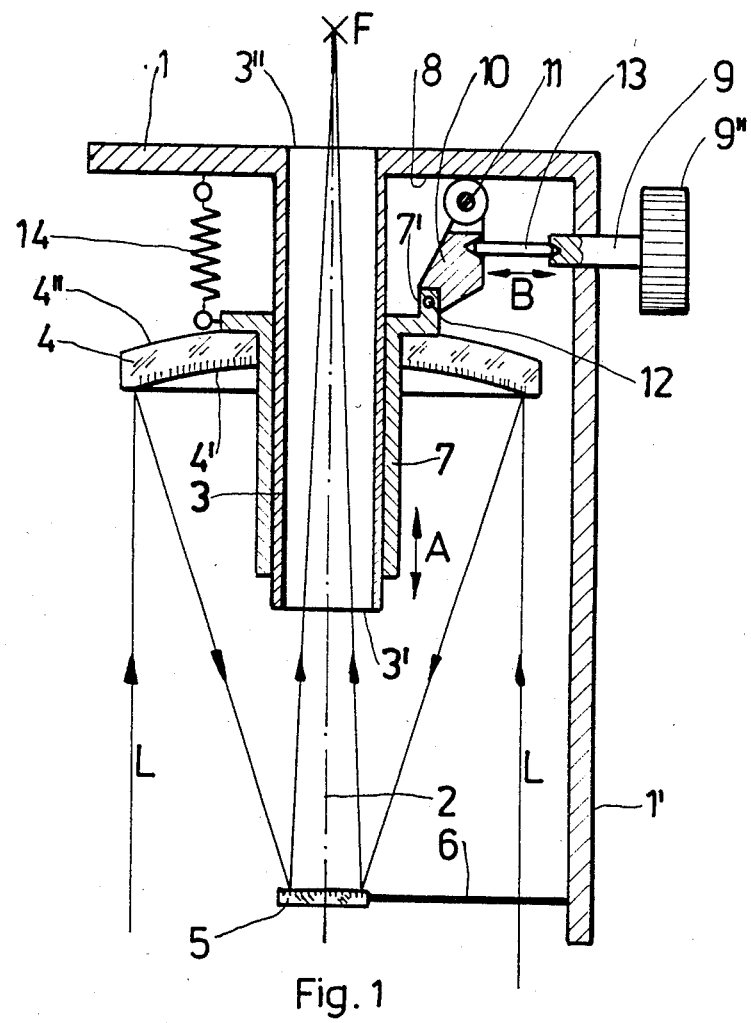
FIG. 1 is a schematic sectional view of a focusing arrangement for a reflecting telescope including a cross-slope gear, and FIG. 2 a schematic sectional view of a part of a focusing arrangement for a reflecting telescope including an elbow gear.

In FIG. 1 a reflecting telescope comprises in a housing 1 (only partially shown) and symmetrically about an optical axis 2, a tubular guide 3, extending along a part of said axis 2.

A reflector mount 7 is displaceably fitted to the outer wall of said tubular guide 3 and serves for supporting a primary reflector 4 which by a circular central opening fits to the outer wall of said reflector mount 7. The primary reflector 4 has a reflecting face 4' in opposition to a secondary reflector 5 secured by an arm 6 to a side wall 1' of the housing 1, and a rear face 4" in opposition to an interior face 8 of the housing 1 which face 8 is substantially at right angles to the side wall 1'.

In order to effect a defined displacement substantially without any backlash and tilt of the reflector mount 7 along the tubular guide 3 a cross-loop gear is provided beteen the rear face 4" and the interior face 8. The cross-loop gear is connected to an adjustment screw 9 which is seated for rotation in the side wall 1' of the telescope housing 1.

The cross-loop gear constituted of a gear member 10 is connected by a joint 12 via one end portion of the member 10 to a nose 7' of the reflector mount 7. The other end portion of the member 10 is provided with a roller 11 which is frictionally connected to the interior face 8 for ride-on movement thereupon. The member 10 is connected via a rod 13 to the adjustment screw 9.

Said rod 13 rests in indentations of a central portion of the member 10 and of the screw 9, respectively, held in position by spring force. Staggered by preferably 180° relative to the joint 12 about the optical axis 2 a resilient member 14 is provided which via one end portion is attached to the amount 7 adjacent the rear face 4" and via its other end portion to the interior face 8 of the housing 1.

In operation, the reflecting telescope to be focussed reflects light beams L which impinge upon the reflecting face 4' of the primary reflector 4 from where the beams L are directed to the secondary reflector 5 which, in turn, directs the light beam L through the tubular guide 3 to a point F.

In order to focus the radiation L upon the point F the principal or primary reflector 4 is displaced along the axis 2 in one of the directions indicated by the double arrow A.

To this end a knurled knob 9' of the adjustment screw 9 is rotated in a respective direction so that the screw 9 is displaced in the respective direction indicated by a double arrow B due to the threaded portion of the screw 9 meshing a respective counter-part of the side wall 1' (not shown in detail). When, for example, the screw 9 moves towards the cross-loop gear 10, the movement is transfered by the rod 13 to the gear member 10, which moves towards the socket 3. While the roller 11 rolls on the face 8 the member 10 via the joint 12 and the nose 7' displaces the mount 7 downwards and, hence, the reflector 4 moves in the same direction so that the focus F is adjusted as required.

The movement of mount 7, and therefore of the reflector 4, in this event, is exercised against the force of the spring 14 which always effects that the backlash between all kinematic members is substantially eliminated and that the rod 13 is frictionally connected to the adjustment screw 9 and the member 10.

When the knob 9' is rotated in the reverse direction, compared to the above action, then the adjustment screw 9 moves towards the side wall 1'. By force of the spring 14 the reflector 4 with the mount 7 moves "upwards" towards the face 8 by simultaneous movement of the roller 11 along the face 8 towards the side wall 1' and a respective reset of the member 10 as permitted by the rod 13/screw 9 motion.

Figure 2:
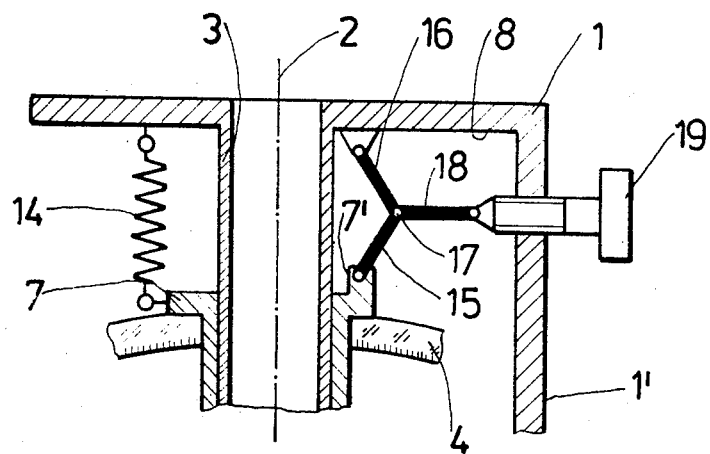

In FIG. 2 an alternative solution of the reflector adjustment arrangement of FIG. 1 is constituted of an elbow lever gear arranged between the mount 7 and the interior face 8 of the telescope housing 1. The elbow lever gear is constituted of the arms 15 and 16 having a common elbow joint 17.

The arm 15 is hinged at 7' to the mount 7 and the member 16 is hinged to the face 8 of the telescope housing 1. A connecting rod 18 is secured via its one end portion to the elbow joint 17 and via its other end portion to an adjustment screw 19 provided in the side wall 1' of the telescope housing 1. The operation is in analogy to the arrangement of FIG. 1.

I claim:

1. An arrangement for focusing a reflecting telescope having a primary reflector and a secondary reflector optically aligned to one another about a common optical axis,
comprising
a cylindrical housing having a cylinder axis,
said cylinder axis being coincident with said optical axis,
said cylindrical housing having a rear face and a side wall,
a tubular guide means being secured to said rear face symmetrically to said optical axis,
a tubular reflector mount being for fitting about said tubular guide means,
said tubular reflector mount being displaceable along said tubular guide means,
said tubular reflector mount being provided with a nose portion in opposition to said rear face, said primary reflector having a further rear face in opposition to said rear face, and a central opening,
said primary reflector being mounted via said central opening to said tubular reflector mount,
a lever gear means,
an adjustment screw being provided in said side wall adjacent said rear face,
said lever gear means having a first end portion adjacent said nose, a second end portion adjacent said rear face, and a central portion in opposition to said adjustment screw,
said nose and said first end portion being connected to one another via a pivot,
said rear face and said second end portion being connected via a connection means,
said connection means between said rear face and said second end portion being a roller secured to said end portion and moving on said rear face,
a connection rod,
said connection rod being for frictionally connecting said central portion to said screw,
at least one spring means having two end portions, one of said end portions being connected to said tubular mount adjacent said further rear face in diametrical opposition
about said optical axis relative to said nose, the other of said end portions being connected to said rear face,
said spring means being for forcing said primary reflector via its tubular mount towards said rear face,
said screw, when rotated, being for displacing said primary reflector via said tubular mount,
said nose, said pivot, said lever gear means and said connection rod, along said tubular guide means in action with and counteraction, respectively, to said spring means.

2. An arrangement for focusing a reflecting telescope having a primary reflector and a secondary reflector optically aligned to one another about a common optical axis,
comprising
a cylindrical housing having a cylinder axis,
said cylinder axis being coincident with said optical axis,
said cylindrical housing having a rear face and a side wall,
a tubular guide means being secured to said rear face symmetrically to said optical axis,
a tubular reflector mount being for fitting about said tubular guide means,
said tubular reflector mount being displaceable along said tubular guide means,
said tubular reflector mount being provided with a nose in opposition to said rear face,
said primary reflector having a further rear face in opposition to said rear face, and a central opening,
said primary reflector being mounted via said central opening to said tubular reflector mount,
a lever gear means,
an adjustment screw being provided in said side wall adjacent said rear face,
said lever gear means having a first end portion adjacent said nose, a second end portion adjacent said rear face, and a central portion in opposition to said adjustment screw,
said lever gear means being an elbow lever gear, constituted of a first arm incorporating said first end portion, a second arm incorporating said second end portion, and said central portion being an elbow joint hinged to a connection rod, said nose and said first end portion being connected to one another via a pivot, said rear face and said second end portion being connected via a connection means, said connection rod being for frictionally connecting said central portion to said screw, at least one spring means having two end portions, one of said end portions being connected to said tubular mount adjacent said further rear face in diametrical opposition about said optical axis relative to said nose, the other of said end portions being connected to said rear face, said spring means being for forcing said primary reflector via its tubular mount towards said rear face, said screw, when rotated, being for displacing said primary reflector via said tubular mount, said nose, said pivot, said lever gear means and said connection rod, along said tubular guide means in action with and counteraction, respectively, to said spring means.

* * * * *